Oct. 31, 1961 C. C. MILLER, JR 3,007,009

MAGNETIC RECORDING AND REPRODUCING APPARATUS

Filed April 24, 1957 2 Sheets-Sheet 1

Inventor
CARLOS C. MILLER, JR.
By Percy P. Lantzy
Attorney

Oct. 31, 1961 C. C. MILLER, JR 3,007,009

MAGNETIC RECORDING AND REPRODUCING APPARATUS

Filed April 24, 1957 2 Sheets-Sheet 2

Inventor
CARLOS C. MILLER, JR.
By [signature]
Attorney

United States Patent Office 3,007,009

Patented Oct. 31, 1961

3,007,009

MAGNETIC RECORDING AND REPRODUCING APPARATUS

Carlos C. Miller, Jr., Northridge, Calif., assignor to International Telephone and Telegraph Corporation, Nutley, N.J., a corporation of Maryland Filed Apr. 24, 1957, Ser. No. 654,965
16 Claims. (Cl. 179—100.2)

This invention relates to magnetic recording and reproducing apparatus and more particularly to devices which record at one speed and reproduce at another speed.

A serious radio communication problem is that of obtaining negligible interference between a number of simultaneous operating channels for use in specific frequency bands where the traffic load is very heavy. One suggested method is that of time sharing in place of radio frequency channeling and is based upon breaking each speech signal into successive trains of one second duration, time compressing each such train into a speech signal burst of 5 milliseconds duration and then transmitting 100 such bursts successively in each second in order to multiplex 100 speech channels into one radio frequency carrier. This requires that some suitable form of memory storage be employed to store the recorded signals until they are reproduced and transmitted. A relatively inexpensive form of storage device is magnetic tape or other form of magnetic surface which is movable and can be constantly used and re-used, as where the information is recorded, reproduced and then erased to allow the process to be repeated for successive increments of information. It is clear that two speeds are required, a slow speed for recording, and a faster speed for reproducing. Machines have been devised which use this principle of recording at one speed and reproducing the information at another speed, but they are complex and expensive. It has also been necessary to devise complicated and intricate means of rotating the reproducing head and the recording head in such positions that one will not interfere with the operation of the other.

In the copending application of A. G. Richardson, filed February 6, 1957, Serial No. 638,891, now U.S. Patent No. 2,929,925, a system has been disclosed to solve the above-mentioned problem. My invention provides an improved system for rapid readout of slow recorded information.

It is therefore an object of this invention to provide an improved magnetic recording and reproducing apparatus which records a continuous stream of signals and reads them out in short bursts in which the original frequencies have been multiplied by some known amount.

Another object is to provide a magnetic recording and reproducing apparatus of high precision to minimize distortion and to insure accurate operation.

A feature of this invention is that the recording head records over a track composed of two curved portions which are mutually symmetrical and coincide at different times with a portion of the path of the reproducing head.

Another feature is that the recording head is oscillated over a given arc to record two curved portions of the recording track.

Still another feature is that in one embodiment herein, the centers of the two curved portions of the recorded track, the path of the reproducing head and of the oscillatory arc traveled by the recording head coincide, the two curved portions constituting arcs of a great circle which coincide with the path of the reproducing head.

Still another feature of this invention is the use of a signal gate coupled to the output of the reproducing head and means synchronized to the rotation of the reproducing head to cause the gate to open for the conduction of signals reproduced from a magnetized surface.

The above-mentioned and other features and objects of this invention will become more apparent by reference to the following description taken in conjunction with the accompanying drawings, in which.

Figure 1:
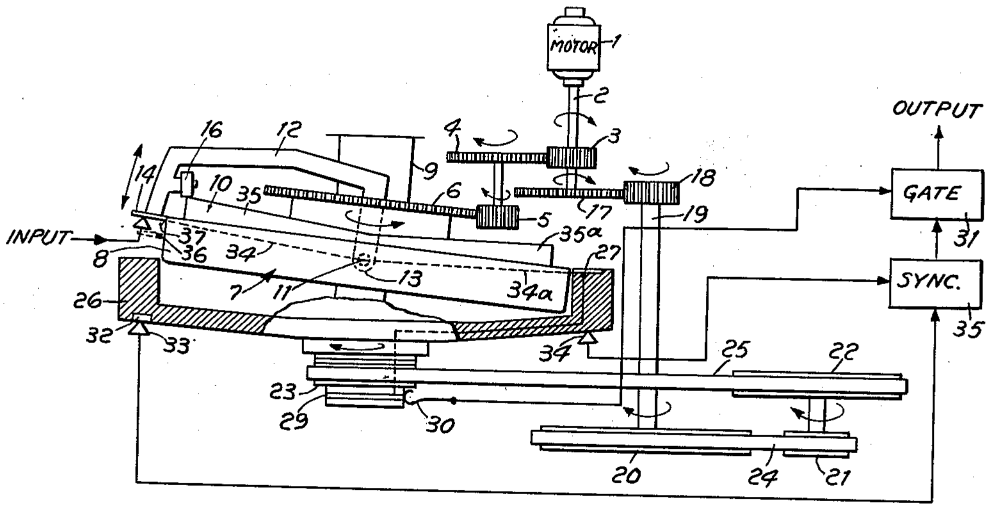
FIG. 1 is an elevation view of one embodiment of this invention.
Figure 2:
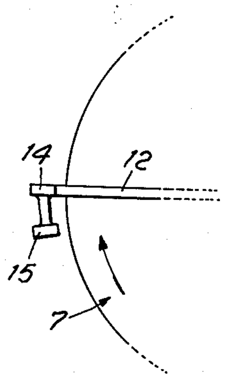
FIG. 2 is a fragmentary view of a portion of the embodiment of FIG. 1.
Figure 3:
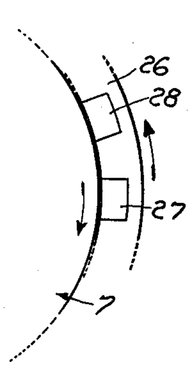
FIG. 3 is a fragmentary view of another portion of the embodiment of FIG. 1.

With reference to FIGS. 1, 2, and 3, there is shown a motor 1 with a drive shaft 2, to which is coupled a gear train composed of gears 3, 4, 5 and 6. Gear 6 is an integral part of a drum assembly 7. The other parts of the drum assembly 7 include a magnetizable surface 8, a shaft 9 and a cam 10. The magnetizable surface 8 is a drum segment which is a section of a sphere, the center of which is at point 11. A U-shaped arm 12 is pivoted at the same center point 11 by means of a pivot pin 13. A recording head 14 and erase head 15 are fastened to the opposite end of the arm 12. The recording head 14 and erase head 15 are oscillated transversely across the magnetized surface 8 by the travel of a cam follower 16 along the periphery of the cam 10. The extension of drive shaft 2 carries a gear 17 which meshes with gear 18 and drives the shaft 19. By means of pulleys 20, 21, 22 and 23 and the connecting belts 24 and 25, a high speed ratio relative to the rotation of the drum 7 is obtained to rotate the hollow cylinder 26 about the magnetizable surface 8. A recording head 27 and erase head 28 are set inside the drum 26 and as closely as possible to the magnetizable surface 8. The axis of rotation of the high speed cylinder 26 passes through the center 11 and is disposed at an angle to the axis of rotation of the magnetizable surface 8 to allow the cylinder 26 to rotate continuously without mechanical interference from the oscillating recording head 14 and erase head 15. The reproducing head 27 is coupled to the slip ring 29, collector brush 30 contacts slip ring 29, and its output is coupled to gate 31. A bar magnet 32 is mounted in the cylinder 26 and is used with two magnetic pick-up heads 33 and 34 which are coupled to a synchronizer 35, as a pulse generator for synchronization. The output of the synchronizer 35 is fed to the gate 31 which serves as an electronic switch to open the circuit at the proper time when readout scanning of the recorded track begins and to close the circuit at the end of the scanning cycle.

In this embodiment, the speed of the magnetizable surface 8 is 30 r.p.m. and the cylinder 26 rotates at 6,000 r.p.m. During compression, one second of speech is recorded on one half of the circumference of a great circle of the sphere, as indicated by the dotted line 34, by the oscillating recording head 14. The cam 10 is designed with two symmetrical paths 35 and 35*a* on its circumference so that in 360 degrees rotation of the surface 8, it will move the recording head 14 transversely across the surface 8 and in conjunction with the said rotation of the surface 8 will produce two 180-degree arcs of two great circles 34 and 34*a*, with center at 11. At the beginning of the recording cycle, the cam actuated recording head 14 is at the midpoint of the surface 8 at 36; at 90 degrees rotation the recording head 14 has moved to the edge of the surface 8 to point 37. Then the head 14 is moved transversely in the opposite direction until it again reaches the point 36 at the end of 180 degrees rotation of the surface 8. The cycle is then repeated for the next second of speech recording. After the recorded speech is read out by the reproducing head 27 whose path for 180° of rotation coincides with the recorded track of 180°, the erase head 15 erases the recorded information and allows a fresh cycle of speech to be recorded.

Figure 4:
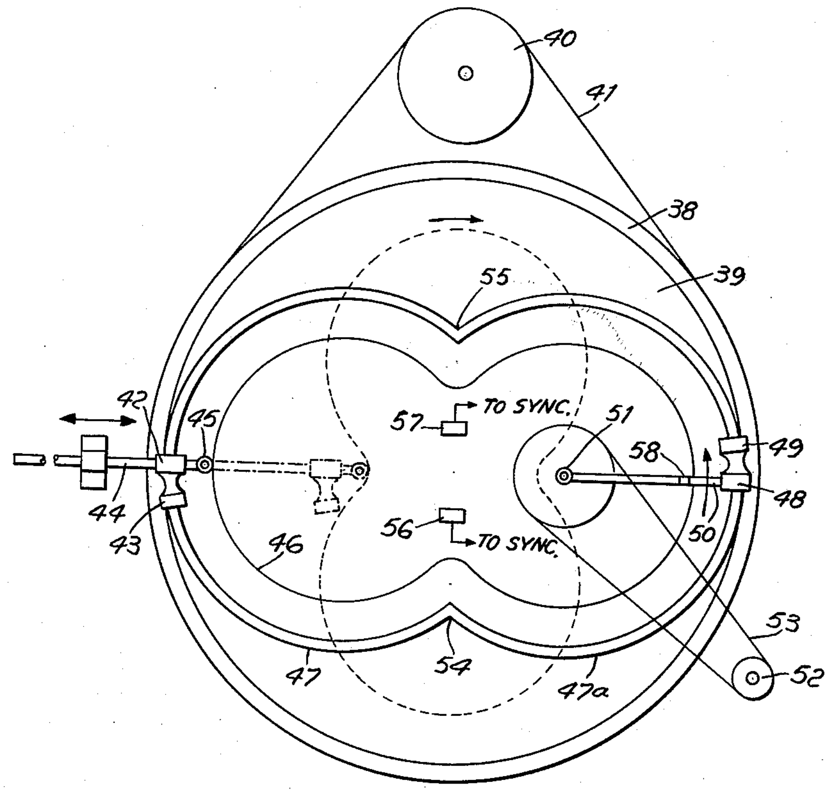
FIG. 4 is a plan view of another embodiment of this invention.

An embodiment of this invention wherein the magnetizable surface is flat is shown in FIG. 4. Disc 38 carries on its top surface a magnetizable surface 39, and is rotated by drive shaft 40 by means of belt 41. The recording heat 42 and the erase head 43 are carried by the arm 44 which is moved radially across the surface 39 by means of the cam follower 45, attached to the other end of the arm 44, following the cam 46. The two halves of the cam 46 are symmetrical and are designed to trace two symmetrical cycles of recorded tracks 47 and **47*a* on the surface 39 in 360 degrees rotation thereof. A readout head 48 and an erase head 49 are fastened to the end of a member 50 which is attached to a rotatable shaft 51. The rotatable shaft 51 is rotated by a drive shaft 52 by means of belt 53. The radius of the circular path described by the rotation of the readout head 48 is equal to the radii of the recorded tracks 47 and 47*a*. When the recorded track 47 has rotated until it occupies the position of track 47*a*, then the recorded track 47*a* and the circular path of the readout head 48 are concentric and coincident. In order to synchronize the readout head 48 to start the reproducing cycle at point 54 and terminate it at point 55, there are provided two pick-up heads 56 and 57 which receive impulses from a magnet 58 carried by the member 50. When the information on the track 47*a* has been reproduced, it is then erased by the erase head 43 as the track 47*a* is moved to that position. It is evident that the shaft 51 must be so positioned that there will be no collision between the readout head 48 and the recording head 42** during the operation of the apparatus.

In both embodiments, the rotation of the reproducing heads 27 and 48 are continuous and the reproducing heads 27 and 48 are electrically actuated only during the reproducing or scanning cycle, when the recorded information is read off. It is to be understood that the relative speeds of recording and reproducing as stated herein are given by way of example only and do not constitute any limitations of this invention.

It is also to be understood that while I have described the principles of my invention in relation to an apparatus wherein recording is made at a slow speed and the reproduction is effected at a faster speed, the reverse can be done so that the recording may be made at a faster rate and the reproducing at the slow rate. For this reason erase heads are provided to operate in conjunction with the adjacent head when it is used for recording.

While I have described above the principles of my invention in connection with specific apparatus, it is to be clearly understood that this description is made only by way of example and not as a limitation to the scope of my invention as set forth in the objects thereof and in the accompanying claims.

I claim:

1. An apparatus for magnetically recording and reproducing signals comprising rotatable means carrying a magnetizable surface, a reproducing head, means to rotate said reproducing head along a circular path of given radius, a recording head and means moving said recording head relative to said surface to magnetize said surface along a track having at least two curved portions each comprising an arc of said given radius, the circles of said arcs being differently located so that each of said arcs coincides with a portion of said path at different instances of time during the rotation of said surface, said arcs being joined together to constitute a closed loop track.

2. An apparatus for magnetically recording and reproducing signals comprising rotatable means carrying a magnetizable surface, a reproducing head, means to rotate said reproducing head along a circular path of given radius, a recording head and means moving said recording head relative to said surface to magnetize said surface along a track having at least two curved portions each comprising an arc of said given radius, the circles of said arcs being differently located so that each of said arcs coincides with a portion of said path at different instances of time during the rotation of said surface and the centers of said circles and said circular path coincide.

3. An apparatus for magnetically recording and reproducing signals comprising rotatable means carrying a magnetizable surface, a reproducing head, means to rotate said reproducing head along a circular path of given radius, a recording head and means moving said recording head relative to said surface to magnetize said surface along a track having at least two curved portions each comprising an arc of said given radius, the circles of said arcs being differently located so that each of said arcs coincides with a portion of said path at different instances of time during the rotation of said surface and said means moving said recording head comprises means to oscillate said recording head through a given arc.

4. An apparatus for magnetically recording and reproducing signals comprising rotatable means carrying a magnetizable surface, a reproducing head, means to rotate said reproducing head along a circular path of given radius, a recording head and means moving said recording head relative to said surface to magnetize said surface along a track having at least two curved portions each comprising an arc of said given radius, the circles of said arcs being differently located so that each of said arcs coincides with a portion of said path at different instances of time during the rotation of said surface and the magnetizable surface is spherical with the centers of said spherical surface, said circles and said circular path coinciding.

5. An apparatus according to claim 1 wherein said magnetizable surface is planar and said circles and said path lie in substantially the plane of said surface.

6. An apparatus according to claim 1 wherein said magnetizable surface is planar and said means for moving said recording head comprises means to move said recording head back and forth across said magnetizable surface along a path coinciding with an extension of the line joining the centers of said circular path and the center of rotation of said magnetizable surface.

7. An apparatus for magnetically recording and reproducing signals comprising rotatable means carrying a magnetizable surface, a reproducing head, means to rotate said reproducing head along a circular path of given radius, a recording head, means moving said recording head relative to said surface to magnetize said surface along a track having at least two curved portions each comprising an arc of said given radius, the circles of said arcs being differently located so that each of said arcs coincides with a portion of said path at different instances of time in the rotation of said surface, a signal gate coupled to the output of said reproducing head and means synchronized to the rotation of said reproducing head to cause the gate to open for conduction of signals from said track, said arcs being joined together to constitute a closed loop track.

8. An apparatus for magnetically recording and reproducing signals comprising rotatable means carrying a magnetizable surface, a reproducing head, means to rotate said reproducing head along a circular path of given radius, a recording head, means moving said recording head relative to said surface to magnetize said surface along a track having at least two curved portions each comprising an arc of said given radius, the circles of said arcs being differently located so that each of said arcs coincides with a portion of said path at different instances of time in the rotation of said surface, a signal gate coupled to the output of said reproducing head and means synchronized to the rotation of said reproducing head to cause the gate to open for conduction of signals from said track and said means moving said recording head comprises means to oscillate said recording head through a given arc.

9. An apparatus according to claim 8 wherein the centers of said circles and said circular path coincide with the center of said oscillatory arc.

10. An apparatus for magnetically recording and reproducing signals comprising a drive shaft adapted to be driven at a given rate of speed, a reproducing head, means coupling said reproducing head to said shaft for rotation along a circular path of given radius, rotatable means carrying a magnetizable surface, means coupling said rotatable means to said shaft for rotation, a recording head, means moving said recording head relative to said surface to magnetize said surface along a track having at least two curved portions each comprising an arc of said given radius, the circles of said arcs being differently located so that each of said arcs coincides with a portion of said path at different instances of time in the rotation of said surface.

11. An apparatus according to claim 10 wherein said means moving said recording head comprises means to oscillate said recording head through a given arc.

12. An apparatus according to claim 11 wherein the centers of said circles and said circular path coincide with the center of said oscillatory arc.

13. An apparatus for magnetically recording and reproducing signals comprising a drive shaft adapted to be driven at a given rate of speed, a reproducing head, means coupling said reproducing head to said shaft for rotation at a first speed, rotatable means carrying a magnetizable surface, means coupling said rotatable means to said shaft for rotation at second speed, a recording head disposed for recording signals on said magnetizable surface, said recording head being adapted to magnetize said surface over a given track, the axis of rotation of said reproducing head being disposed at an angle to the axis of rotation of said surface so that the path of said reproducing head coincides with said recorded track, said first speed of rotation being greater than said second speed of rotation.

14. An apparatus for magnetically recording and reproducing signals comprising a drive shaft adapted to be driven at a given rate of speed, a reproducing head, means coupling said reproducing head to said shaft for rotation along a circular path of given radius at a first speed, rotatable means carrying a magnetizable surface, means coupling said shaft to said rotatable means for rotation at a second speed, a recording head, means to move said recording head back and forth relative to said surface to magnetize said surface along a track having at least two curved portions each comprising an arc of said given radius, the circles of said arcs being differently located so that each of said arcs coincides with a portion of said path at different instances of time in the rotation of said surface, a signal gate coupled to the output of said reproducing head and means synchronized to the rotation of said reproducing head to cause the gate to open for conduction of signals from said track.

15. An apparatus according to claim 14 wherein said recording head moves through an arc of said given radius and the centers of said arc and said circles and said circular path coincide.

16. An apparatus according to claim 14 wherein said magnetizable surface is planar and said recording head moves along a path coinciding with an extension of the line joining the center of said circular path and the center of rotation of said magnetizable surface.

References Cited in the file of this patent

UNITED STATES PATENTS 2,245,286 Marzocchi ______________ June 10, 1941